United States Patent

Walden et al.

Patent Number: 6,154,698
Date of Patent: Nov. 28, 2000

[54] SUPPLEMENTAL RESTRAINT DEPLOYMENT METHOD PROVIDING ROUGH ROAD IMMUNITY

[75] Inventors: Michael K. Walden, Noblesville; Sheri Lynn Patterson, Greentown; Joseph Thomas Dalum, Noblesville, all of Ind.; Gretchen Elizabeth Bubolz, Farmington Hills, Mich.; Kristi Kay Reprogle, Greentown, Ind.

[73] Assignee: Delco Electronics Corp., Kokomo, Ind.

[21] Appl. No.: 09/124,775

[22] Filed: Jul. 30, 1998

[51] Int. Cl.$^7$ ................................................. B60R 22/00
[52] U.S. Cl. ........................... 701/45; 701/46; 180/271; 180/282
[58] Field of Search ........................ 701/45, 46; 180/271, 180/282; 280/734, 735; 307/10.1

[56] References Cited

U.S. PATENT DOCUMENTS

| | | | |
|---|---|---|---|
| 5,282,134 | 1/1994 | Gioutsos et al. | 364/424.05 |
| 5,394,326 | 2/1995 | Liu | 364/424.05 |
| 5,418,722 | 5/1995 | Cashler | 364/424.05 |
| 5,521,822 | 5/1996 | Wang | 364/424.05 |
| 5,668,740 | 9/1997 | Wang et al. | 364/550 |

*Primary Examiner*—William A. Cuchlinski, Jr.
*Assistant Examiner*—Marthe Marc-Coleman
*Attorney, Agent, or Firm*—Jimmy L. Funke

[57] ABSTRACT

An improved deployment method for a vehicular supplemental restraint system, wherein the existence of a rough road condition is indicated if a measure of crash severity obtained from an acceleration sensor exceeds a rough road threshold and the crash event reset criteria are subsequently met with no intervening deployment of the restraint device. The rough road indication is maintained for a timed period, and normal deployment of the restraint device is inhibited during the timed period unless the acceleration signal exceeds a minimum threshold and the measure of crash severity exceeds an additional deployment threshold which is initially higher than the normal deployment threshold. When the rough road condition is detected, a counter is initialized to a predefined value, and then periodically indexed so long as no potential crash event is in progress. If the counter is indexed to another predefined value prior to another rough road detection, the rough road condition is reset. A severe rough road will produce multiple initializations of the counter, resulting in a prolonged rough road indication, whereas a single rough road impact will result in a much shorter rough road indication. Raising the crash severity threshold in the presence of a rough road condition increases immunity to rough road events and allows the use of relatively aggressive reset criteria, while retaining the ability to properly deploy the restraints in a concatenated crash event.

10 Claims, 1 Drawing Sheet

SUPPLEMENTAL RESTRAINT DEPLOYMENT METHOD PROVIDING ROUGH ROAD IMMUNITY

This invention relates to automotive supplemental inflatable restraint (SIR) systems, and more particularly to a deployment method that differentiates rough roads from a crash event.

BACKGROUND OF THE INVENTION

In general, SIR systems perform a number of functions including acceleration sensing, signal processing and analysis, and deployment of one or more restraint devices such as frontal or side air bags or seat belt pretensioners in response to a sensed crash event. Typically, the acceleration signal is monitored to detect a potential crash event, and then integrated over the course of the crash event to determine if the crash event is sufficiently severe to warrant deployment of restraints.

In addition to detecting a potential crash event, the system must distinguish between acceleration signals caused by driving over a rough road, and by a crash event. In the former instance, deployment is not desired, while in the latter instance, deployment is desired if the crash is sufficiently severe, as described above. The term "rough road" as used in this context is rather broad, and may include driving over a curb or a beam lying in the roadway.

The problem in distinguishing between a rough road and a crash event is that the rough road may produce relatively strong acceleration signals, perhaps even higher in initial magnitude than a crash event. Since the signals attributable to rough road impacts tend to be relatively short in duration compared to a crash event, a known deployment control technique is to reset the crash analysis function any time the acceleration signal falls below a calibrated threshold for at least a predefined period of time. While this technique thereby effectively ignores acceleration signals due to rough road impacts, it may result in delayed deployment in concatenated crash events where the initial impact resembles a rough road impact. Ideally, the system should have reset criteria calibrated to reject rough road impacts, and yet have the ability to deploy the restraints should a severe crash event immediately follow the rough road event.

SUMMARY OF THE PRESENT INVENTION

The present invention is directed to an improved deployment method for a vehicular supplemental restraint system having an acceleration sensor and a restraint device to be deployed for occupant protection in a crash event, where the existence of a rough road condition is reliably distinguished from a crash event, and wherein deployment of the restraints can be triggered if the rough road event is concatenated with a crash event.

According to the invention, the existence of a rough road condition is indicated if a measure of crash severity obtained from the acceleration sensor exceeds a rough road threshold and the crash event reset criteria are subsequently met with no intervening deployment of the restraint device. The rough road indication is maintained for a timed period, and normal deployment of the restraint device is inhibited during the timed period unless a minimum acceleration threshold is exceeded and the measure of crash severity reaches an additional deployment threshold that is initially higher than the normal deployment threshold. When the rough road condition is detected, a counter is initialized to a predefined value, and then periodically indexed so long as no potential crash event is in progress. If the counter is indexed to another predefined value prior to another rough road detection, the rough road condition is reset. A severe rough road will typically produce multiple initializations of the counter, resulting in a prolonged rough road indication, whereas a single rough road impact will result in a much shorter rough road indication. Raising the crash severity threshold in the presence of a rough road condition increases immunity to rough road events and allows the use of relatively aggressive reset criteria, while retaining the ability to properly deploy the restraints in a concatenated crash event

DETAILED DESCRIPTION OF THE DRAWINGS

Figure 1:
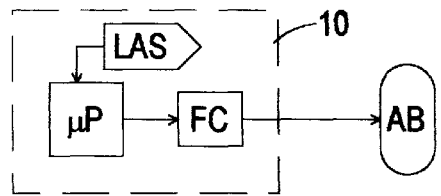
FIG. 1 is a schematic diagram of a SIR system including a programmed microprocessor for carrying out the deployment method of this invention.

FIG. 1 generally depicts a vehicle supplemental inflatable restraint system in which one or more inflatable restraints, or air bags AB, are deployed in a severe crash event to protect the vehicle occupants. A deployment control system, designated generally by the reference numeral 10, may be packaged as a single electronic module and mounted on a frame element in a central portion of the vehicle. Fundamentally, the system 10 includes a longitudinal acceleration sensor LAS for sensing longitudinal acceleration of the vehicle, a microprocessor $\mu P$ for receiving the output signal of longitudinal acceleration sensor LAS, and a firing circuit FC which is triggered by microprocessor $\mu P$ to deploy the air bags AB in the event of a severe crash. In general, the microprocessor $\mu P$ determines the severity of the crash by integrating the longitudinal acceleration signal to form a delta-velocity or $\Delta V$ signal, and comparing the $\Delta V$ signal to a pre-defined and time dependent velocity boundary curve. If a crash event is severe enough that the $\Delta V$ signal crosses the velocity boundary curve, the microprocessor $\mu P$ signals the firing circuit FC to deploy the air bags AB.

One of the important functions performed by the microprocessor $\mu P$ in determining whether to deploy the air bags AB is distinguishing between the acceleration signals caused by a crash event and those caused by driving over a rough road or an object such as a curb or a wood beam lying in the road. In the later instances, deployment is to be inhibited. Since the high level acceleration signals produced during most rough road events are short in duration compared to a crash event, the microprocessor $\mu P$ effectively ignores the rough road events by resetting the acceleration integrator and the velocity boundary, whenever the acceleration signal falls below a calibrated threshold for at least a predefined period of time. However, it is critical to properly calibrate the threshold in case a rough road event precedes a crash event. In such an instance, the microprocessor $\mu P$ would ideally reset the deployment algorithm prior to the crash event so as to time synchronize the $\Delta V$ signal and velocity boundary with the crash event. This means that the reset threshold must be calibrated to a relatively high, or aggressive, level so that the reset occurs quickly. However, this too is problematic since the initial part of a crash may resemble a rough road event, particularly in what is referred to as concatenated crash events in which two or more impacts occur consecutively.

The deployment method of the present invention overcomes the above-described problem by recognizing a rough road event, and then inhibiting deployment of the restraints for a timed period after the event unless the acceleration signal exceeds a minimum threshold and the measure of crash severity (i.e., the computed ΔV signal) exceeds a secondary threshold that is higher (at least initially) than the normal deployment threshold. The rough road condition is detected when the ΔV signal exceeds a rough road threshold and the reset criteria are subsequently met with no intervening deployment of the restraint device. When the rough road condition is detected, a counter is initialized to a predefined value, and then periodically decremented so long as the deployment algorithm is in an inactive (not-enabled) state. If the counter is decremented to zero prior to another rough road detection, the rough road condition is cleared, and the normal deployment thresholds are re-activated. A severe rough road will produce multiple initializations of the counter, resulting in a prolonged rough road indication, whereas a single rough road impact will result in a much shorter rough road indication. The method thereby allows the use of a relatively aggressive reset threshold, while retaining the ability to properly deploy the restraints in a concatenated crash event.

Figure 2:
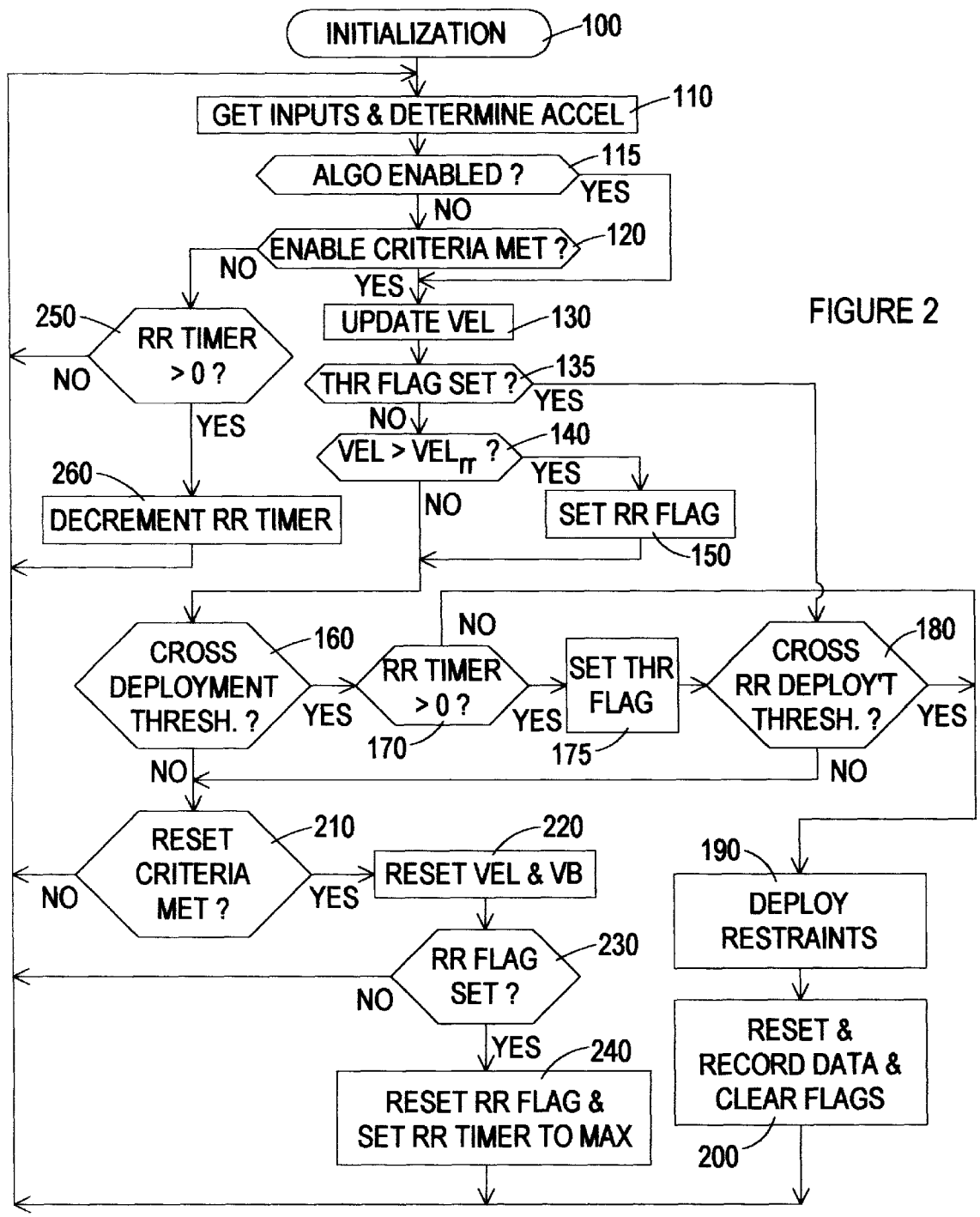
FIG. 2 is a flow diagram representative of computer program instructions executed by the microprocessor of FIG. 1 in carrying out the deployment method of this invention.

A flow diagram representative of computer program instructions executed by the microprocessor μP of FIG. 1 in carrying out the above-described deployment method is set forth in FIG. 2. Referring to FIG. 2, the block 100 designates aL series of instructions executed at the initiation of vehicle operation for initializing various registers, counters, flags and variables to a pre-defined state. Thereafter, the block 110 is executed to read the output signal of the longitudinal acceleration sensor LAS, and to filter it to form a filtered acceleration signal ACCEL. If the deployment algorithm is not already enabled, as determined at block 115 (by the status of a flag, for example), the block 120 is executed to determine if the enable criteria for the deployment algorithm have been met. Typically, the algorithm is enabled when the acceleration signal ACCEL exceeds a predefined acceleration threshold, indicating the initiation of a possible crash event. If the enable criteria are met, or if the algorithm is already enabled, the block 130 is executed to update the value of the ΔV signal (VEL). If the ΔV signal has not already crossed the normal deployment threshold (i.e., the velocity boundary curve described above), as determined at block 135, the block 140 is executed to compare the ΔV signal to a rough road threshold, VELrr. If the threshold VELrr is exceeded, the block 150 is executed to set a rough road flag (RR FLAG), indicating a possible rough road condition. If a reset event subsequently occurs with no intervening deployment of the restraints, as determined at blocks 210-230, block 240 is executed to reset the rough road flag and to initialize a counter, referred to herein as the rough road timer or RR TIMER, to a predetermined count, MAX. When the algorithm is inactive, as determined at block 120, the blocks 250-260 periodically decrement the RR TIMER until the count reaches zero.

The blocks 160-180 determine if the restraints should be deployed. If the updated ΔV signal VEL is less than the normal deployment threshold (i.e., the velocity boundary curve described above), the blocks 170-180 are skipped, and block 210 is executed to determine if the deployment algorithm should be reset. This involves comparing the acceleration signal ACCEL to a threshold acceleration value, and signaling a reset if ACCEL is lower than the threshold for at least a predetermined period of time. As discussed above, the deployment method of this invention permits the use of a relatively aggressive, short duration, reset threshold, thereby enabling the ΔV signal to be time synchronized with a crash event that follows the rough road event. If the reset criteria are met, the block 220 is executed to reset the ΔV signal and the velocity boundary VB.

If the updated ΔV signal VEL exceeds the normal deployment threshold and there is no count in the RR TIMER, as determined at blocks 160 and 170, blocks 190 and 200 are executed to deploy the restraints, to reset the various timers and flags, and to command the recording of crash data. If there is a count in the RR TIMER, block 175 sets the THR flag to indicate that the normal deployment threshold has been met, and the block 180 is executed to determine if the acceleration signal exceeds a minimum threshold and the updated ΔV signal VEL exceeds a rough road deployment threshold (RR Deployment Threshold) which is initially higher than the normal deployment threshold of block 160. As indicated at block 135, the THR flag is used to by-pass the blocks 140-175 if the normal deployment threshold has been exceeded in the presence of a detected rough road condition. If the rough road threshold is exceeded, the blocks 190-200 are executed to deploy the restraints, as in the case of a normal deployment. If the rough road threshold is not exceeded, deployment is inhibited, and the block 210 is executed to determine if reset criteria are met, as discussed above.

From the above description, it will be seen that in operation of the deployment algorithm, the RR TIMER is used to designate a rough road condition which may involve a single event or several successive events. Each time a rough road event is confirmed by block 230, the RR TIMER is re-initialized at the count MAX. Thus, a severe rough road will produce multiple initializations of the RR TIMER, resulting in a prolonged rough road indication, whereas a single rough road impact will result in a much shorter rough road indication.

In summary, the deployment method of this invention overcomes the problem of quickly resetting the deployment algorithm in response to a rough road condition (to maintain time synchronization of the algorithm with a subsequent crash event) while allowing deployment with a higher threshold in a concatenated crash event. While described in reference to the illustrated embodiment, it is expected that various modifications in addition to those suggested above will occur to those skilled in the art. In this regard, it will be understood that this invention is not limited to the illustrated embodiment, and that deployment methods incorporating such modifications may fall within the scope of this invention, which is defined by the appended claims.

The embodiments of the invention in which an exclusive property or privilege in claimed are defined as follows:

1. A deployment method for vehicular supplemental restraint system having an acceleration sensor and a restraint device to be deployed for occupant protection in a crash event, the method comprising the steps of:

monitoring an output signal of the acceleration sensor to generate an indication of a potential crash event initiation;

resetting the indication of crash event initiation if the output signal falls below a reset threshold for at least a predetermined period of time;

processing the acceleration sensor output signal to obtain a measure of crash severity, beginning each time said indication of potential crash event initiation is generated;

normally deploying the restraint device if the measure of crash severity exceeds a primary deployment threshold indicative of a severe crash event;

generating an indication of a rough road condition if (a) the measure of crash severity exceeds a rough road threshold and (b) the indication of crash event initiation is subsequently reset with no intervening deployment of the restraint device;

inhibiting the normal deploying of the restraint device in response to the generation of said indication of a rough road condition; and deploying the restraint device despite the indication of a rough road condition if the measure of crash severity exceeds a secondary deployment threshold which is initially higher than said primary deployment threshold.

2. The method set forth in claim 1, including the step of:

resetting said indication of a rough road condition a predetermined period of time after the generation of such indication unless another indication of a potential crash event initiation is generated.

3. The method set forth in claim 1, wherein the generation of an indication of a rough road condition includes the steps of:

initializing a counter to a predefined value;

periodically indexing said counter so long as another indication of a potential crash event initiation is not generated; and resetting said indication of a rough road condition when said counter reaches a reference value.

4. The method of claim 3, including the step of:

re-initializing said counter to said predefined value each time the measure of crash severity exceeds the rough road threshold and the indication of crash event initiation is subsequently reset with no intervening deployment of the restraint device.

5. A deployment method for vehicular supplemental restraint system having an acceleration sensor and a restraint device to be deployed for occupant protection in a crash event, the method comprising the steps of:

monitoring an output signal of the acceleration sensor to generate an indication of a potential crash event initiation;

resetting the indication of crash event initiation if the output signal falls below a reset threshold for at least a predetermined period of time;

processing the acceleration sensor output signal to obtain a measure of crash severity, beginning each time said indication of potential crash event initiation is generated;

normally deploying the restraint device if the measure of crash severity exceeds a primary deployment threshold indicative of a severe crash event;

generating an indication of a rough road condition for a timed period if (a) the measure of crash severity exceeds a rough road threshold and (b) the indication of crash event initiation is subsequently reset with no intervening deployment of the restraint device;

inhibiting the normal deploying of the restraint device during said timed period if the measure of crash severity is less than a secondary deployment threshold which is initially higher than said primary deployment threshold; and deploying said restraint device during said timed period if the measure of crash severity exceeds said secondary deployment threshold.

6. The method set forth in claim 5, including the step of:

extending a duration of said timed period if another indication of a potential crash event initiation is generated during said timed period.

7. The method set forth in claim 5, wherein the generation of an indication of a rough road condition includes the steps of:

initializing a counter to a predefined value;

periodically indexing said counter so long as another indication of a potential crash event initiation is not generated; and resetting said indication of a rough road condition when said counter reaches a reference value.

8. The method of claim 7, including the step of:

re-initializing said counter to said predefined value each time the measure of crash severity exceeds the rough road threshold and the indication of crash event initiation is subsequently reset with no intervening deployment of the restraint device.

9. A deployment method for vehicular supplemental restraint system having an acceleration sensor and a restraint device to be deployed for occupant protection in a crash event, the method comprising the steps of:

monitoring an output signal of the acceleration sensor to generate an indication of a potential crash event initiation;

resetting the indication of crash event initiation if the output signal falls below a reset threshold for at least a predetermined period of time;

processing the acceleration sensor output signal to obtain a measure of crash severity, beginning each time said indication of potential crash event initiation is generated;

normally deploying the restraint device if the measure of crash severity exceeds a primary deployment threshold indicative of a severe crash event;

initializing a counter to indicate a rough road condition if (a) the measure of crash severity exceeds a rough road threshold and (b) the indication of crash event initiation is subsequently reset with no intervening deployment of the restraint device;

periodically indexing said counter so long as another indication of a potential crash event is not generated;

resetting said counter when a count stored in the counter reaches a predefined value; and inhibiting the normal deploying of the restraint device between the initializing and resetting of said counter if the measure of crash severity is less than a secondary deployment threshold which is initially higher than said primary deployment threshold; and deploying said restraint device between the initializing and resetting of said counter if the measure of crash severity exceeds said secondary deployment threshold.

10. The method of claim 9, including the step of:

re-initializing said counter each time the measure of crash severity exceeds the rough road threshold and the indication of crash event initiation is subsequently reset with no intervening deployment of the restraint device.

* * * * *